United States Patent [19]

Egbert et al.

[11] Patent Number: 5,410,439
[45] Date of Patent: Apr. 25, 1995

[54] DISK FILE WITH CLEARANCE AND GLIDE MEASUREMENT AND EARLY HEAD CRASH WARNING

[75] Inventors: Gary T. Egbert, Byron; Hal H. Ottesen; Gordon J. Smith, both of Rochester, all of Minn.

[73] Assignee: International Business Machines Corporation, Armonk, N.Y.

[21] Appl. No.: 200,838

[22] Filed: Feb. 22, 1994

Related U.S. Application Data

[63] Continuation of Ser. No. 885,578, May 19, 1992, abandoned.

[51] Int. Cl.⁶ .............................................. G11B 15/46
[52] U.S. Cl. ................................ 360/75; 360/73.03; 324/212
[58] Field of Search ............... 360/75, 77.04, 77.05, 360/103, 73.03; 324/212

[56] References Cited

U.S. PATENT DOCUMENTS

| | | | |
|---|---|---|---|
| 4,716,472 | 12/1987 | McNally | 360/8 |
| 4,777,544 | 10/1988 | Brown et al. | 360/75 |
| 4,812,927 | 3/1989 | Fechner | 360/75 |
| 4,841,389 | 6/1989 | Hoyt et al. | 360/75 |
| 4,872,071 | 10/1989 | Easton et al. | 360/31 |
| 5,280,340 | 1/1994 | Lacey | 356/357 |

OTHER PUBLICATIONS

Lath., "Modern Digital and Analog Communication Systems" Second Edition pp. 81–82, 1989.

"Head Flight Height Monitoring" Gaudet et al., *IBM Technical Disclosure Bulletin*, vol. 11, No. 12, May 1969, p. 1650.

Magnetic Recording, vol. II, Mee & Daniel, Chapter 2, pp. 19–127, 1988.

*Primary Examiner*—Aristotelis Psitos
*Assistant Examiner*—James T. Wilson
*Attorney, Agent, or Firm*—Baker, Maxham, Jester & Meador

[57] ABSTRACT

The invention produces and maintains clearance and glide test results for a disk file, stores these results, and monitors head clearance and disk asperities over the useful life of the file using native disk file electronics. The disk file includes a predictive failure analysis component which utilizes clearance and glide test results to predict impending failure of a disk in the disk file.

16 Claims, 5 Drawing Sheets

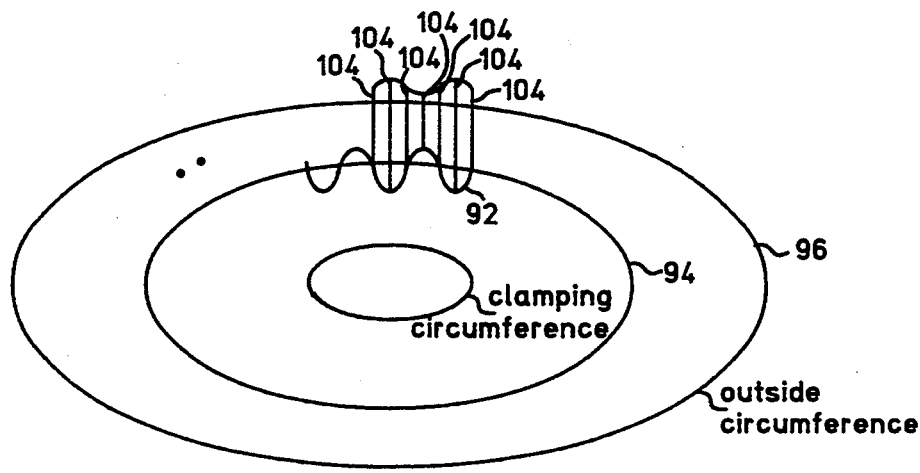
*FIGURE 4*
| TRACK 1 | PROFILE SN | PROFILE |
|---------|------------|---------|
| TRACK 2 | PROFILE SN | PROFILE |
| ⋮ | | |
*FIGURE 5*
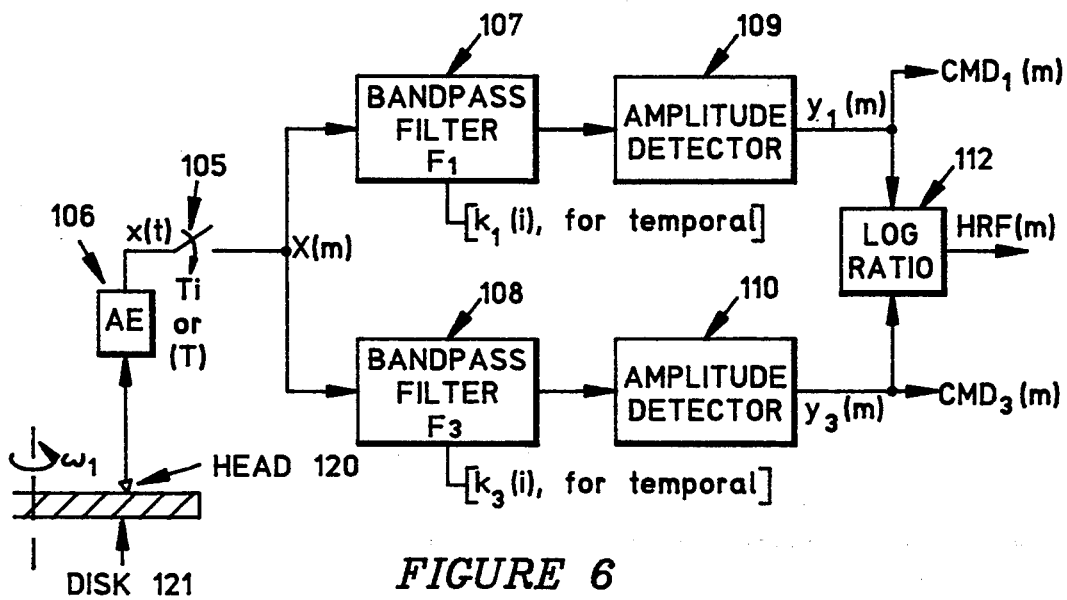
*FIGURE 6*

DISK FILE WITH CLEARANCE AND GLIDE MEASUREMENT AND EARLY HEAD CRASH WARNING

This application is a file wrapper continuation of application Ser. No. 07/885,578, filed May 19, 1992, now abandoned.

BACKGROUND OF THE INVENTION

1. Field of the Invention

This invention concerns a disk file storage apparatus of the type in which one or more rigid disks are provided for storage of data which is written to, or read from, the disks by transducers ("heads") while the disks spin. In particular, the invention concerns the measurement of spacing between the transducer mechanisms and the disks.

2. Description of the Prior Art

Data storage on rigid disks is covered extensively in Volume II of the reference work entitled MAGNETIC RECORDING, Mee, et al, eds., McGraw-Hill, 1988. In Chapter 2 of this work, a rigid disk file is described as "a stack of rigid disks" which are rotated at a high speed and whose surfaces are written to or read from using arm-mounted heads which are suspended and positioned by an actuator assembly over the surfaces. The heads are supported against disk surfaces by a thin cushion of air generated by rotation of the disks.

A disk file servo processor controls the radial position of heads with respect to disks so that selected circumferential tracks on a disk surface can be read or written to. A data channel is provided for each head. Data is recovered in a data channel by peak detection means, while head drive circuitry is provided to write data to a disk surface.

The amount of data which can be recorded on a disk (the "density" of data) is a primary indication of how well a disk file operates. One significant limitation on data density is the "spacing loss" which corresponds essentially to the distance between the head and the magnetic recording surface of a disk. Relatedly, the smaller the spacing between a head and a disk, the higher the potential data density. Variation of the distance during rotation of the disk will cause a corresponding variation in data density. Therefore, disk file manufacturing requires not only head suspension mechanisms which will stably position a head close to a disk, but also disk whose surfaces are as flat and as defect-free as possible.

Therefore, one of the critical control evaluations made during manufacture of disk file components and assembly of disk file mechanisms is the measurement of head/disk spacing. U.S. Pat. No. 4,777,544 of Brown et al, commonly assigned with this application, well describes a method and a means for measurement of head/disk spacing. The '544 patent lays out a harmonic ratio fly height (HRF) technique for calculating head/disk spacing measurement by comparing readback spectral amplitude ratios obtained by reading a previously-recorded clearance measurement signal track at nominal and zero "flying heights".

The means of the '544 patent for taking the nominal and zero height measurements are analog components, which are impractical to integrate into a disk file mechanism because of cost, size, and performance considerations. Further, the '544 patent is directed essentially to measurement of an average flying height and makes no provision for obtaining the profile of a circumferential disk track in the form of a plurality of flying height measurements at discrete points along the track.

SUMMARY OF THE INVENTION

It is, therefore, the principal object of this invention to set forth a method and apparatus for measuring head/disk clearance in a digital manner which provides a head/disk clearance profile over each track or a plurality of tracks on a disk surface.

The invention is practiced in a disk file which includes one or more rigid disks, means for rotating the rigid disks, one or more read/write heads, actuator means for moving the heads across respective surfaces of the disks, servo-processor means controlling the actuator means and the means for rotating, for radially positioning the heads with respect to respective surfaces, and for setting a speed at which disks rotate, and data channel means connected to the heads for reading signals from, and writing signals to, the disk surfaces. In this context, the invention is a combination for measuring the distance between a head and the surface of a disk, and includes:

a digital signal processor in the disk file which responds to a clearance control signal indicative of the speed of the disk by producing predetermined harmonics of a measurement signal read from the surface of the disk by the head;

a clearance test control mechanism in the disk file which:

positions the head with respect to a predetermined area of the surface where the measurement signal is located;

rotates the disk at predetermined speeds; and generates the clearance signal;

a clearance test analysis mechanism in the disk file, connected to the digital signal processor, and responsive to the predetermined harmonics which produces clearance signals representing the flying height of the head with respect to the surface of the disk at each of a plurality of predetermined locations on a circumference of the surface of the disk; and storage in the disk file and connected to the clearance test mechanism which stores spacing signals for a plurality of circumferences on the disk surface.

The invention provides the means in a disk file mechanism to maintain and selectively reference a head/disk clearance history which extends from the time that the disk file is manufactured and assembled. The invention supports the provision of a predictive failure analysis mechanism in the disk file which maintains and updates the profile history and which uses the history to anticipate and warn of impending failure caused by a head/disk "crash".

Another benefit provided by the invention is the ability to detect mechanical defects such as asperities on the surface of a disk through a technique known as "glide testing". In this testing procedure, performed using the components of the distance-measuring combination, peak values read from a measurement signal on the disk are compared to average values. If the difference between the peak and average values is greater than a predetermined threshold, the values are further analyzed for the presence of a "contact signature" corresponding to a disk asperity.

Accordingly, another objective of this invention is to provide a method and apparatus for detection of irregularities on the surface of a disk using the components of the head/disk spacing measurement method and means.

The foregoing and other objects, features, and advantages of the invention will be apparent from the following detailed description of preferred embodiments of the invention as illustrated in the accompanying drawings.

BRIEF DESCRIPTION OF THE DRAWINGS

FIG. 4 is a composite schematic diagram and waveform plot showing a head/disk clearance profile on a section of a track containing a clearance signal.

FIG. 5 is a schematic representation of a table maintained in disk file storage for containing the head/disk clearance profile history.

FIG. 6 is a schematic illustration of a digital mechanism in a disk file data channel according to the invention.

DESCRIPTION OF THE PREFERRED EMBODIMENTS

This invention as described is applied to a disk file including rigid electro-magnetic disks. However, those skilled in the art will appreciate that the invention is not so limited, but may be applied to other mechanically moving magnetic storage apparatus, as well.

As the referenced '544 patent points out, the terms "head/disk clearance" and "flying height" are used interchangeably in the art. These terms are considered to be synonymous, and are freely substituted one for another in this description.

Figure 1:
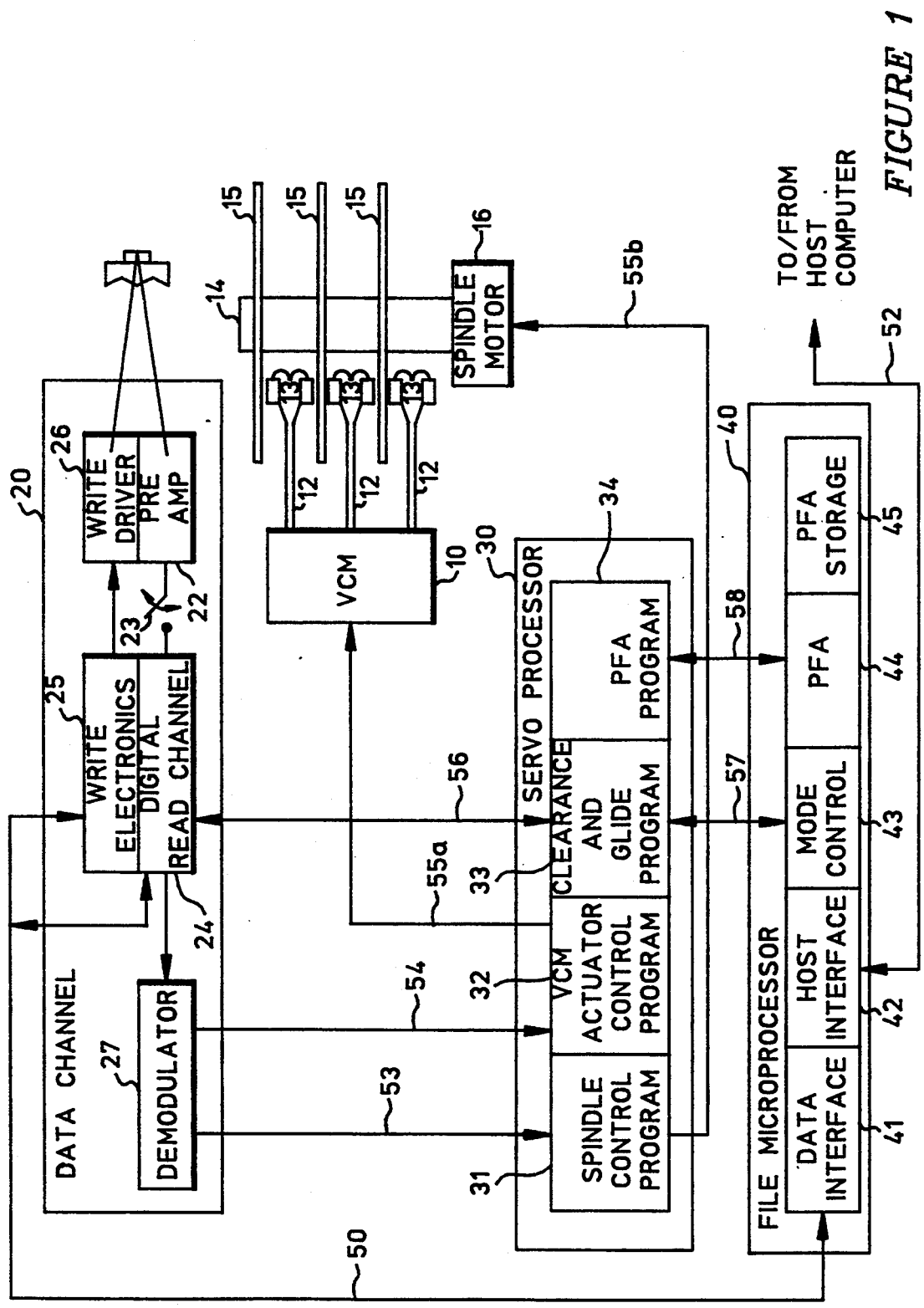
FIG. 1 is a block diagram of a disk file which incorporates the invention.

FIG. 1 illustrates a disk file assembly and includes a voice coil motor (VCM) assembly 10 with attached arms and suspensions 12, and heads 13. A spindle assembly includes a hub 14, rigid disks 15, and a spindle motor 16. The heads 13 "fly" on both top and bottom surfaces of the disks 15 as they read and/or write data on the magnetic material deposited on the surfaces of the disks. In this regard, a head "flies" over a disk surface supported by a bearing of air induced between the disk and the head in response to the high speed rotation of the disk.

The electro-magnetic transducer in a head is connected to a data channel, one of which is indicated by reference numeral 20. The read and write electronics portions of the data channel 20 are connected to an individual head by conventional means (not shown) such as a flex cable. As a disk rotates adjacent an individual head, a signal is read from a track on the surface of the disk by electro-magnetic detection in the head transducer and then is amplified using a preamplifier 22. The output of the preamplifier 22 is fed to data channel read electronics 24 which filter and equalize the amplified signal and which typically employ a peak detection procedure to detect data in the amplified, processed signal. The channel read electronics 24 may also include clocking circuits to extract a data clock.

The data channel 20 also includes write electronics 25 which may precondition a data signal to be laid down on a disk track. The write electronics provide the signal which is to be recorded to a write driver 26 that is conventionally connected to a head transducer for writing onto a disk track.

The disk file of FIG. 1 also contains processing components including a servo processor 30 and file microprocessor 40. Conventionally, the servo processor 30 may include an invokable application run on a separate microprocessor or on the file microprocessor 40. The servo processor 30 includes a spindle control program component 31 and a VCM actuator control program component program 32. The servo processor is provided to control the actuator assembly including the VCM 10 and arms and suspensions 12 to position the heads 13 at fixed radial locations over the surfaces of the disks 15. The positioning function of the actuator control program 32 is essentially conventional, employing servo signals written continuously onto disk surfaces or into dedicated servo sectors on the surfaces. These signals are read by the heads 13 and fed back to the servo processor 30 through read channel electronics 24 and a demodulator 27. The actuator program 32 functions to move an actuator to a desired position and to maintain the actuator in the desired position by reduction of position error. The actuator control program implements track following, track searching, head registration, and head parking functions which are well understood.

The file microprocessor 40 includes a data interface section 41 which performs interface functions including encoding and decoding of data to be written to and read from a disk, a host interface section 42 for providing control and data information to and receiving commands and data from a host computer, and a mode control section 43 for establishing and changing modes of microprocessor operation.

In the invention, a clearance and glide program 33 is provided as a component of the servo processor 30. This illustrates a preferred embodiment and best mode; however, the inventors contemplate that the clearance and glide program can be lodged according to design considerations in any of the microprocessor resources of a disk file. In addition, predictive failure analysis (PFA) components 34, 44, and 45 are provided in the invention. These programming components are explained in greater detail below.

The major interconnections between the components of the disk file illustrated in FIG. 1 include a data signal path 50 between the data interface 41 of the file microprocessor 40 and the read and write electronics 24 and 25 of the data channel 20. The command/data signal path 52 connects the disk file of FIG. 1 through its host interface 42 with a host computer (not shown). Demodulated servo signals are provided to the spindle control program 31 and actuator control program 32, respectively, from the demodulator 27 over signal paths 53 and 54. The signal path 55a conducts a servo control signal to the VCM 10. Signal path 55b conducts a motor speed control signal from the spindle control program 31 to the spindle motor 16. Signal paths 56, 57, and 58 are used in the invention. The signal path 56 connects the digital read channel electronics 24 with the clearance and glide program 33, conducts control signals to configure the read channel electronics 24 for testing according to the invention and also conducts clearance and glide signal components to the clearance and glide program 33 for analysis. The clearance and glide program is enabled by an appropriate control signal sequence on signal path 57 from the mode control 43. Clearance and glide program data is passed directly by conventional programming means to the predictive failure analysis (PFA) program element 34 in the servo processor 30 and from there on the signal path 58 to the a PFA component 44 and PFA storage 45 in the file microprocessor 40.

Upon receipt of a clearance and glide test command from either the host computer or as requested by the PFA program 34, the clearance and glide section 33 of the servo processor 30 takes control of the digital read channel electronics 24, the VCM control programming 32, and the spindle control program 31 in order to perform clearance and glide test measurements. Results from the clearance and glide test measurements are passed to the PFA program section 34 for preliminary failure analysis. The results of the preliminary analysis are provided to the PFA section 44 of the file microprocessor 40 which, according to the invention, stores results in PFA storage 45 for further trend analysis or calls for additional measurements using the mode control 43. If an imminent head crash or other head/disk interface problem condition is detected, the host computer is notified using the host interface section 42. Additionally, PFA data may be saved in an error log on one or more of the disk surfaces using the data interface section 41. The data interface section 41 is also used to retrieve previously saved clearance and glide test data to be analyzed by the PFA, should such data be stored on one or more of the disks 15.

HEAD/DISK CLEARANCE MEASUREMENTS

The invention overcomes the problem of not being able to determine, using in-situ disk file components, clearance between any head/disk pair in the disk file. The invention employs the theoretical basis of the HRF technique discussed at length in the '544 patent, using digital electronics and the processing capacity of the disk file to calculate head/disk clearance, and maintains historical files of such measurements for predictive failure analysis.

The HRF technique employs a measurement signal written on a disk track, and a multi-step "spin down" of the disk speed to derive a set of points from which a velocity versus clearance curve may be derived. The measurement signal laid down in a disk surface track has a constant spectrum which generates a readback signal including at least two different frequencies which are harmonics of the measurement signal. Preferably, the first and third harmonics are included in the readback signal. The clearance measurement procedure requires rotating the disk at operational speed, and determining the instantaneous amplitudes of the harmonic frequencies at that speed. The logarithm of the ratio of the amplitudes is indicative of head/disk clearance. The rotational velocity of the disk is then reduced while the instantaneous amplitude of the readback signal is monitored. As is known, reduction of the rotational speed of the disk from its operational speed decreases the pressure of the air cushion on the head, thereby reducing the head/disk clearance. As the velocity of the disk is decreased, the instantaneous amplitudes of the harmonics are determined until a velocity is reached where the amplitudes stop changing. When the amplitudes stop changing, the head is assumed to be in contact with the disk. At each measurement velocity between operational velocity and the contact velocity, the ratio of the instantaneous amplitudes of the two harmonics is calculated and numerical methods are employed to derive the flying height at each measurement velocity, using the zero clearance velocity as reference.

Figure 2:
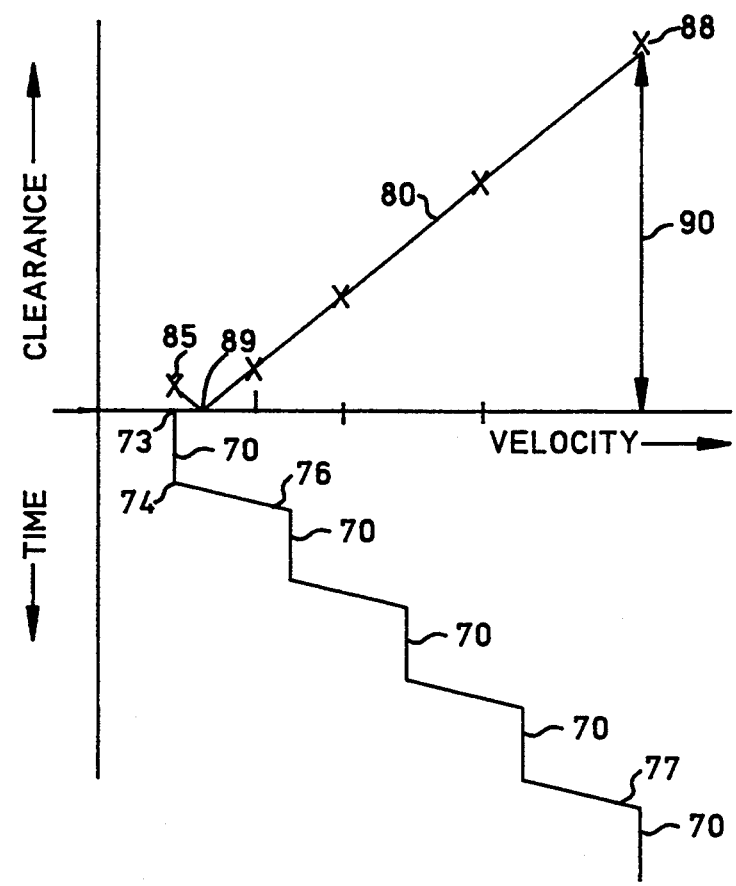
FIG. 2 is a plot showing head/disk clearance as a function of a sequence of discrete disk velocities.

In FIG. 2, a head/disk clearance measurement procedure according to the HRF technique is shown graphically. In FIG. 2, the measurement procedure reverses the sequence described above and is essentially a "spin-up" procedure. The line segments 70 give the spindle velocity as a function of time. The amount of head/disk clearance, as determined by the HRF clearance measurement is given by the curve 80, which shows head/disk clearance as a function of spindle velocity. Clearance measurement begins at 73 which coincides with start-up of the spindle motor. For each vertical line segment 70 (such as the segment between the points 73 and 74), the spindle velocity is held constant and the necessary digital measurements to determine head/disk clearance are taken. For a particular head, the digital measurement for start-up corresponds to the point 85 on the clearance versus velocity curve 80. After all heads have been measured at start-up (which occurs at point 74), the spindle velocity is increased to point 76. Measurements for all heads are repeated at this velocity, and so on. The process continues for higher velocities until the measurements have been completed at the nominal operational velocity indicated at point 77. For the particular head given by the clearance curve 80, this point occurs at 88.

The measurement data for each head at each velocity can be processed dynamically or stored in an array for later processing. In either case, the clearance at any velocity is found by subtracting the minimal clearance measurement at point 89 from the clearance measurement at the respective velocity. For example, the nominal clearance at the operational velocity (point 88) is found by subtracting the clearance valve at point 89 from that at point 88. This determination is made for each head. The most direct approach to making this measurement is to assume a mathematical functional form for the continuous clearance curve 80 and then, based on the measurements taken at the discrete velocities, to establish a best fit for the chosen function. From this, the minimum clearance at 89 can be found. Following this step, the clearance for each head is then simply the difference between the digital measurements made at the nominal speed (point 88) and the minimal speed (point 89) scaled by the wavelength of the recorded clearance signal. The magnitude of the clearance is shown in FIG. 2 as the distance 90.

Figure 3A:
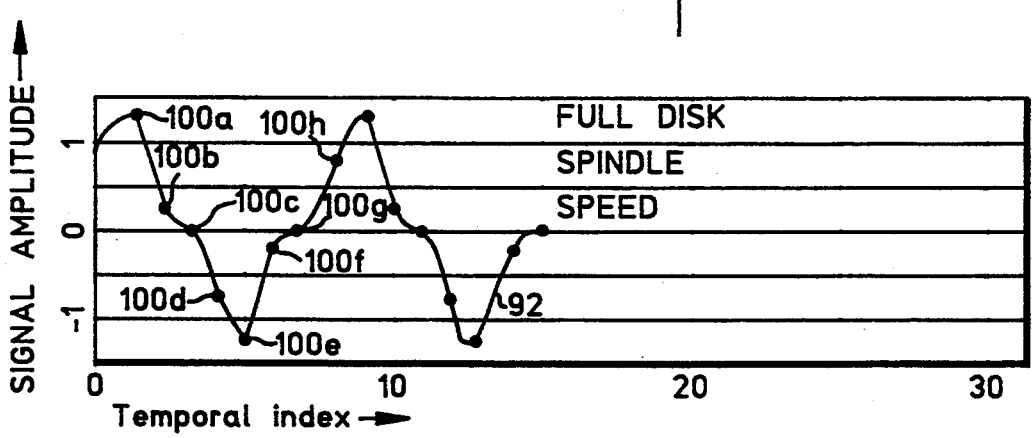
FIGS. 3A and 3B are plots showing the signal amplitude of a section of a disk tract containing a clearance signal in which the signal is sampled at a given rate while the disk is spinning at full speed (FIG. 3A) and half speed (FIG. 3B).
Figure 3B:
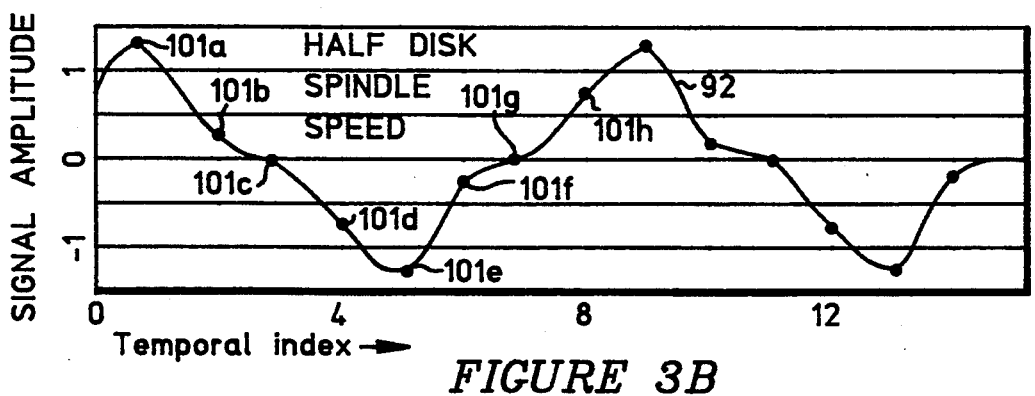

FIGS. 3A, 3B, and 4 illustrate how the invention employs spatial signal processing of the readback signal to make clearance measurements at a series of locations along a circumferential track on which a clearance measurement signal has been written. Of course, the relative dimensions and recorded signal formats are exaggerated or altered from those encountered in practice; however, the exaggerations are for clarity, and not for limitation. In FIG. 4, a high-frequency clearance measurement signal 92 is recorded in a circumferential track 94 of a disk 96. Assume that a head is positioned over the track 94. FIG. 3A represents the clearance measurement signal as one of constant periodicity and shows a portion of the signal in a minute section of the track 94. According to the invention, the signal is sampled at a given rate $f_s$ (samples per second), while the disk is spinning at operational speed. FIG. 3A illustrates a sampling rate providing eight samples per period of the recorded clearance measurement signal. Each sample is taken at a particular time and is represented on the waveform 92 by the points 100a–100h.

Next, assume that the rotational velocity of the disk is reduced to one-half of that represented by FIG. 3A and that the sampling rate $f_s$ is reduced to one-half of the sampling rate illustrated in FIG. 3A. The clearance measurement signal, with eight samples 101a–101h, is illustrated in FIG. 3B. Note that the samples of the signals in FIG. 3A and 3B occur at exactly the same points in the readback signal and correspond to identical locations in the track 94.

The implication of FIGS. 3A, 3B, and 4 is clear: if the sampling rate of the readback signal generated by a head in response to a clearance measurement signal on a particular track is related to the inverse of the measurement signal's period, the sampling procedure will generate a sequence of samples corresponding to a sequence of physical locations along the track. Another implication: if the sampling rate is changed directly with the rotational speed of the disk during spindown, sets of samples can be generated for each of the sequence of physical locations and the instantaneous flying height at each location can be calculated using a digital form of the HRF algorithm described above. Thus, a profile comprising an envelope connecting a sequence of discrete flying heights in each location of a sequence of locations along the track 94 can be generated by using the HRF measurement technique in combination with spatial sampling as described above. In FIG. 4, a portion of such an envelope is illustrated by connecting the tips of each of the vectors 104, where each vector is a link proportional to the instantaneous flying height calculated at the disk track location at which the vector is positioned.

Well-known digital techniques can be employed to obtain and process the samples and to calculate the flying heights in the manner discussed above, and a plurality of such profiles can be generated for each of a plurality of tracks on a disk surface. These profiles can be stored in tabular form as illustrated in FIG. 5 together with a profile sequence numbers ("PROFILE SN") significant of when a profile was taken. Thus, for example, at disk file assembly, tracks 1–n would each have a profile taken, each profile being given the sequence number 1. Next, at some later time after the disk file is placed in operation, another set of profiles for tracks 1–n can be taken and given profile sequence numbers 2, and so on.

FIG. 6 illustrates, in block diagram form, the digital components necessary for processing a readback signal generated in response to a clearance measurement signal. In FIG. 6, a read head 120 reads the clearance measurement signal from a track on a surface of a disk 121. The disk spins at discrete velocity $w_i$ i=1, 2, 4, ... A sampling switch circuit 105 samples and digitizes the output x(t) of an arm electronics (AE) amplifier 106 at a rate ($1/T_i$) which is proportional to the disk spindle speed $w_i$, where $T_i$ is the sampling period. Digital bandpass filters 107 and 108 filter out the first and third harmonic signal components of the sampled readback signal, respectively. Due to the spatial sampling described above, the coefficients in the filters 107 and 108 are independent of the rotational velocity $w_i$. The outputs of the bandpass filters 107 and 108 are fed, respectively, to amplitude detectors 109 and 110. The amplitude detectors average the outputs in the filters 107 and 108 to produce the instantaneous amplitudes of the first and third harmonics, which are designated respectively as $y_1(m)$ and $y_3(m)$. The logarithmic ratio of these instantaneous amplitudes is output by log ratio circuit 112. The signal output by the log ratio circuit 112, denoted as HRF(m) is proportional to the head/disk clearance (flying height) at the rotational velocity $w_i$.

Those skilled in the art will appreciate that a small number of consecutive samples lie over a small physical space of the readback signal x(t) will produce a corresponding value for HRF(m), and that this value can be associated directly with a location on the track where the clearance measurement signal is recorded. In other words, the sequence of discrete values exhibited at the output of the log ratio circuit 112 represents a sequence of relative head/disk clearances at a corresponding sequence of locations on the measurement signal tract and that the log ratio outputs can be mapped to those locations by counting the number of samples, beginning at some predetermined track location.

Those skilled in the art will appreciate that a slight variation of the circuit illustrated in FIGS. 6 will serve to provide the same spatially-mapped sequence of signals by a temporally-based operation. In this regard, the temporally-based operation is similar to the spatial operation described above except that the sampling rate of the switch circuit 105 is fixed at 1/T, where T remains fixed. The band pass filters 107 and 108 now have algorithmic coefficients that are scaled relative to the discrete rotational velocity $w_i$. These sets of coefficients are labeled $K_1(i)$ and $K_2(i)$, where:

$$K_j(i) = [K_j(i,0), K_j(i,1), K_j(i,2), \ldots ]; j=1,3$$

These coefficients can be stored in a look-up table in read-only memory which is accessed in synchronism with the incrementation of the disk rotational velocity during clearance measurement. Under these conditions, the output of the log ratio circuit 112 will be similar to that obtained spatially as described above.

Those skilled in the art will appreciate that the components illustrated in FIG. 6 in either their spatially- or temporally-controlled forms may be implemented by using well-known means either in the digital read channel electronics 24, as an invokable process in the clearance and glide program 33, or partially in both of these components.

Figure 7:
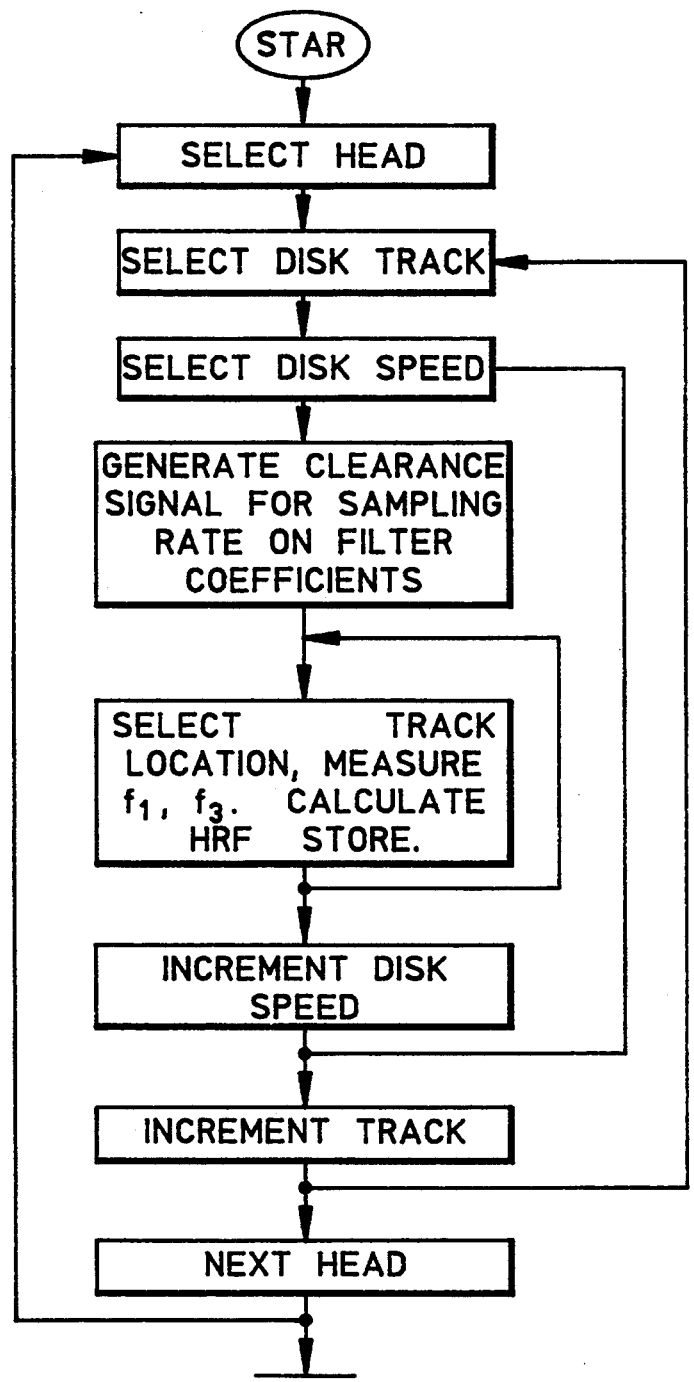
FIG. 7 is a flow diagram illustrating the steps for a disk/head clearance measurement.

FIG. 7 illustrates implementation of the control of the clearance test procedure, and may be implemented, using well-known digital programming techniques, as part of the clearance and glide program 33. The clearance measurement procedure is started by selecting a head/disk pair, positioning the head at a selected disk track and then selecting the initial disk velocity in either "spinup" or "spindown" mode. Once head, track, and velocity have been established, the clearance measurement control component generates a clearance signal corresponding to the disk speed. The clearance signal is provided to either set the sampling rate of the sampling circuit with respect to the disk speed, or the coefficients of the bandpass filters. Next, an initial location is selected on the designated track. The harmonics for the HRF calculations are measured. The head/disk clearance is calculated using the HRF procedure and the results are stored. Alternatively, the harmonic components could be stored and the calculation of HRF clearance left to follow completion of all measurements. After $f_1$ and $f_2$ have been measured at the initial location, the next sample corresponding to the next track location in sequence is accessed, the harmonic frequency calculated, and so on, until measurements have been made of the last location on the selected track. Next, the loop comprising clearance signal generation and measurement of harmonics at the sequence of track locations is traversed again for the next disk speed, and so on. When all sample locations for the highest (or lowest) disk velocity have been measured, the selected head may be positioned at another track for another set of HRF measurements at particular locations around the tract. Measurements are made for as many tracks as design or operational considerations call for and then another head/disk pair is selected and the sequence is repeated.

GLIDE MEASUREMENTS

Glide testing is a disk surface evaluation which is currently made prior to the disk file assembly step in the manufacturing process. As presently practiced, the glide test is a once off procedure which is not performed again during the operational lifetime of the disk. In glide testing, a measurement signal is laid down on a test track of a disk, the disk is spun at its operational velocity, and a readback signal is developed from a head which is positioned over the track at a premeasured height. The magnitude of the readback signal is directly dependent upon head/disk clearance. The glide test seeks changes in the head/disk clearance, reflected by changes in the readback signal which are, more likely than not, attributable to irregularities on the disk surface such as asperities. As is known, asperities can result in catastrophic failure due to head/disk contact.

Referring once again to FIG. 6, it will be appreciated that a clearance measurement signal laid on a disk track can serve the additional purpose of providing a readback signal whose continuous magnitude provides a profile of the disk surface area where the track is written. In FIG. 6, the signal used for glide testing can be derived either from the output of the amplitude detector 109 (the first harmonic signal, $y_1(m)$) or the output of the amplitude detector 110 (the third harmonic signal). The selected signal is called the continuous modulation detection (CMD) signal. In FIG. 6, the first continuous modulation detection signal $CMD_1(m)$ is the instantaneous amplitude of the first harmonic signal, while $CMD_3(m)$ is the instantaneous amplitude of the third harmonic signal.

According to the invention, the surface of a disk (such as the disk 121) is evaluated for mechanical defects by the glide testing procedure. For the invention, disk mechanical defects are identified by measuring the amount and form of displacement of a head relative to a disk surface. Displacement is measured using the process readback signal in the form of either the first or third CMD signal described above.

In the invention, the glide test is performed initially at the time of disk file assembly. In addition, using this invention, it can also be performed at any later time during the life of the disk file. The glide test procedure steps are as follows:

1. A given head is stepped radially across the portion of a disk that is to be glide tested. The physical radial distance between the tracks on the disk must be less than the width of the rail (or pad) of the head having the lowest of flying heights, that is the head which is closest to the surface of the disk, and the greatest width. This restriction will ensure that any disk defect has a chance to contact the lowest flying rail or pad of the head. Without this restriction, it is possible that a disk defect might be missed.

Figure 8:
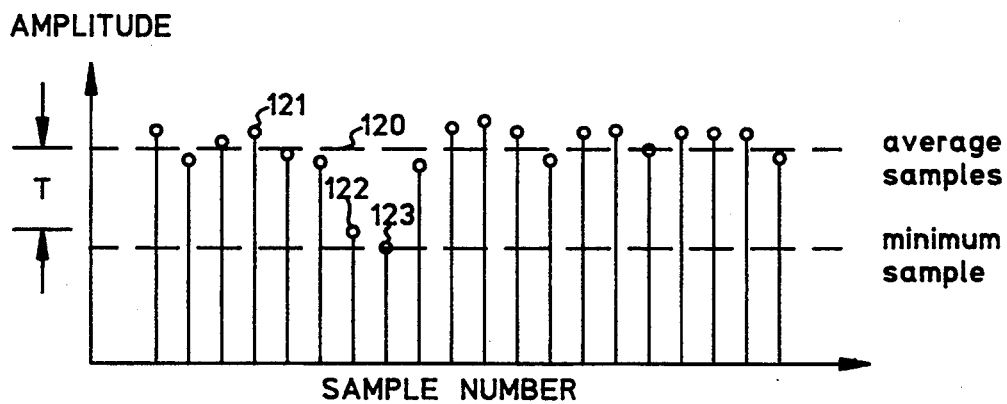
FIG. 8 is a plot of measurements taken on a track containing a glide test signal showing a disk defect.

2. At each track position, either the entire track or a portion of the track is measured for a defect. The detection phase is accomplished by digitization of the selected CMD signal and then determining from the digitized samples if head contact with a disk defect has occurred. This is accomplished by comparing "the instantaneous" peak or root mean square (RMS) amplitude to an "average" peak or RMS amplitude. If the difference between the values is greater than a predetermined threshold, the same digitized samples are analyzed to determine if a "contact signature" is present. FIG. 8 shows an example of a disk defect found during the detection phase. In FIG. 8, each sample number represents the instantaneous or RMS amplitude of the readback signal generated in response to a measurement signal on a disk track at a track location which can be determined from the sample number. In FIG. 8, the samples are averaged, the average being indicated by reference numeral 120. The amplitude range denoted by T is the required threshold difference between the average and minimum sample values to continue in a defect "characterization" mode. For each track, or track portion, having a measurement signal, the detection process is used to decide if further defect characterization is required. If not, defects are detected after checking the entire track or track portion, the head is accessed (moved) to the next track having a measurement signal. The detection procedure is then resumed.

3. If a defect is detected during the detection mode, the defect is characterized either as a "glide defect" or as a non-contact defect. Importantly, a glide defect is a disk defect that is substantially in contact with the head. FIG. 8 illustrates a potential glide defect, where the amplitude profile from sample 121 through 123 indicates a rapid decrease in the head/disk clearance. Further, the sample values at points 122 and 123 along the disk track fall below the range defined by the threshold difference T between the average and minimum sample values required to continue to characterize a track. In the circumstances illustrated by FIG. 8, it can be determined whether head/disk contact occurs by comparing the magnitude values at sample locations 122 and 123 with a value expected if a head were to contact a disk defect.

4. If, after checking all track locations identified during detection, there are no glide defects, the head is moved to the next track and the detection process begins again (that is, there is a loop back to step 2).

5. If a glide defect is found on a track, the action taken depends upon when the glide test is being performed. If the glide test is being performed in manufacturing, for example, the disk with the defect would be replaced. If the defect is detected later in time after the disk file has been manufactured and placed in service, then the result of the defect characterization is sent to the predicted failure analysis (PFA) procedure.

PREDICTIVE FAILURE ANALYSIS

The PFA procedure undertakes several analyses. These analyses answer the following questions:
  a. Is a glide defect new?

b. For a detected glide defect, are there other proximate glide defects on adjacent tracks?

c. If a glide defect has been previously detected, has its apparent height increased since the last recorded measurement?

d. If new, is the height of a glide defect above a critical threshold?

If questions b, c, or d are answered in the affirmative, the PFA procedure invokes the host interface 42 to provide a message to a host computer that a head/disk failure is imminent.

The purpose of the predictive failure analysis (PFA) mechanism, comprising elements 34, 44, and 45 in FIG. 1, is to determine, based on measurements made using this invention, if a disk file failure due to head crash is imminent. The information available to the PFA is that stored during head/disk and glide test measurement procedures. As discussed above, these measurements are mapped by test procedures and sample number to precise disk locations and stored for use by the PFA procedure. The PFA 10 procedure uses both trend and instantaneous information to make a decision.

For the head/disk clearance, the PFA procedure compares results of periodic measurements to determine if a significant trend, either toward increasing or decreasing clearance, is present. There are many statistical methods available to efficiently perform this analysis in the form of an invokable procedure in the components 34 and 44. If a significant trend is found, the host computer is notified.

Also, for head/disk clearance predictive failure analysis, if a single head shows a significant change in clearance as compared to other heads in the same disk file, and this change is "significant", where, "significant" is a matter of design choice, then the PFA components will notify the host computer.

For either analysis, head/disk clearances are measured as described above at any number of locations on any number of tracks on any number of disks in the disk file. These results can be saved in PFA storage 45 and/or on a disk log.

Figure 9:
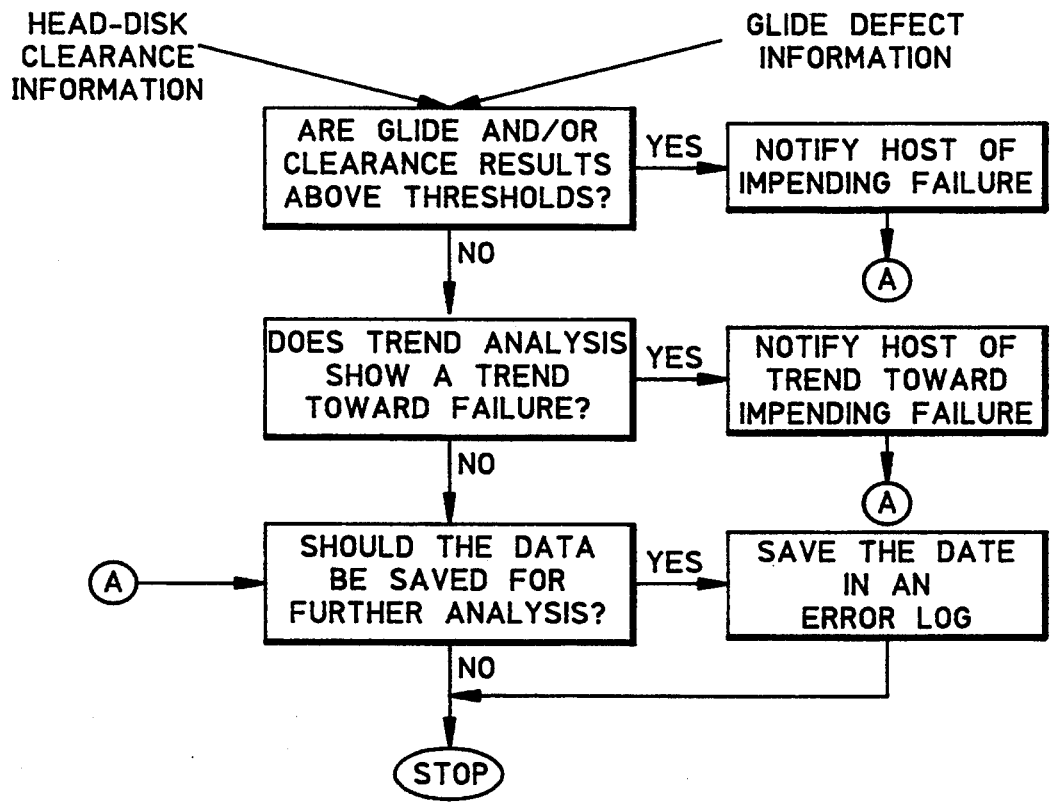
FIGS. 9 is a flow diagram illustrating a predictive failure analysis component of the invention.

FIG. 9 illustrates a flow chart for predictive failure analysis according to the invention. Note that both an immediate and trend analysis of the glide and clearance data is performed. By using both types of analysis, the predictive failure analysis procedure can react to both fast and slowly changing conditions in the disk file.

Accordingly, it has been shown that the invention enables the practitioner to make and maintain measurements of head/disk clearance and disk surface characteristics not only at the time of disk manufacture, but at any time during operation of a manufactured disk file. The ability to monitor these parameters over time using native disk file electronics solves the problem of inexpensively monitoring disk file performance during the lifetime of a disk file and eliminates external test hardware now used only during manufacture and assembly. Disk performance testing can be accomplished at any time in the life of the disk file and the results may be saved to support trend analysis. The existing disk file components can be used on a part-time basis to make the measurements. The servo processor, for example, may be used for clearance measurements during its normal idle period when the disk file is spinning up and/or down. Through the use of shared digital filters, all of the frequency domain analysis can be performed without any significant impact to the storage already in the disk file. The implementation of this invention is also independent of the recording channel used. Through the us of spatial filtering, whereby the readback signal is sampled spatially, the requirements for very high sampling rates and large RAM storage in a disk file are eliminated. Spatial filtering also permits very flexible bandpass filter designs for glide testing.

Optimizations of the HRF method are known and the inventors expect that they will be employed in the invention. For example, improvement of the signal-to-noise value of the measurement signal may be realized by using a signal written that consists of only the first and third harmonics which would optimize measurement accuracy. Similarly, the bandwidth of existing HRF analysis means is approximately 20 kHz. This is insufficient for future glide testing as air bearing frequencies will be on the order of 100 kHz. The disclosed method of glide testing has not such band width limitations.

By using digital filters rather than analog filtering techniques, much more consistency can be expected from the measurements made in this invention as digital operations are transportable and identical. This means that any disk file making clearance and glide measurements will employ a measurement process identical with that of any other disk file. Also, by using digital filters, the need to perform a discrete fourier transform in order to determine the harmonic amplitudes is avoided by use of the invention embodiment in which spatial sampling of the read back signal is based on disk rotational velocity.

Using the on-board signal processing capability according to the invention, rather than performing testing by a SCSI interface, means that tests will be performed faster. Consequently, higher throughput rates will be realized in manufacturing. Incorporation of productive failure analysis provides minimal user impact during lifetime self-assessments of any disk file.

Unlike in-use HRF analyzers known to the inventors, phase-lock techniques are unnecessary for synchronous detection of read back signal harmonics in this invention. This is important in manufacturing when an HRF analyzer cannot phase-lock.

Last, the invention is applicable to any recording technology having a Wallace spacing loss relationship. This includes disk files incorporating inductive and magnetoresistive head technology.

Obviously, while the invention has been particularly shown and described with reference to the preferred embodiment described above, it will be understood by those skilled in the art that many changes in form and detail may be made therein without departing from the spirit and scope of the invention.

We claim:

1. In a disk file which includes a rigid disk, means for rotating the rigid disk, a read/write head, actuator means for moving the head across a surface of the disk, servo processor means controlling the actuator means and the means for rotating for radially positioning the head with respect to the surface and for setting a speed at which the disk is rotated, and data channel means connected to the head for reading signals from, and writing signals to, the disk, a combination for measuring flying height of the head with respect to the surface, the combination comprising:

digital signal processing means in the disk file and responsive to a clearance control signal which indicates speed of the disk for producing first signals corresponding to predetermined harmonics of a flying height measurement signal read from the surface by the head;

test condition means in the servo processor means for:
  positioning the head with respect to a predetermined area of the surface where the flying height measurement signal is located; setting an initial speed at which the disk is rotated;
  selectively changing the speed at which the disk is rotated in a sequence of more than two discrete steps, the disk being rotated at a respective speed at each step of the sequence and being held constant at the respective speed at each step of the sequence; and
  generating the clearance control signal at each respective speed;

test performance means in the disk file, connected to the digital signal processing means, and responsive to the first signals for producing at each respective speed spacing signals representing the flying height of the head with respect to the surface at each of a plurality of predetermined locations on a circumferential track on the surface; and storage means in the disk file and connected to the test performance means for storing spacing signals for a plurality of circumferences on the surface.

2. The combination of claim 1, wherein:
the flying height measurement signal includes a periodic signal of a substantially constant period in a circumferential track on the surface.

3. The combination of claim 2, wherein:
the digital signal processing means includes means for sampling the flying height signal at a rate proportional to the speed at which the disk is rotated; and
the clearance control signal includes a portion which indicates the speed at which the disk is rotated.

4. The combination of claim 2, wherein:
the digital signal processing means includes digital filter means for obtaining the predetermined harmonics in response to filter coefficient values which are proportional to the speed at which the disk rotates; and
the control signal includes a portion indicating the filter coefficient values, 5. The combination of claim 1, wherein:
the digital signal processing means are responsive to the flying height measurement signal for producing a second signal proportional to the amplitude of the flying height measurement signal;
the combination further including:
glide test means in the disk file for providing a profile signal indicating defects on the surface in response to the second signal the profile signal being determined by the glide test means according to the difference between an average value of the second signal and an instantaneous value of the second signal.

6. The combination of claim 5, further including predictive failure analysis means connected to the storage means for providing a failure signal indicating disk file failure:
in response to spacing signals which indicate a change in the flying height of the head; or
in response to the contact signal.

7. The combination of claim 1, wherein:
the digital signal processing means are further responsive to the flying height measurement signal for producing a second signal proportional to the amplitude of the flying height measurement signal;

the combination further including:
means in the disk file for producing third signals in response to the second signal, the third signals representing the difference between an average value of the second signal and an instantaneous value of the second signal and corresponding to a profile of a portion of the surface lying in a circumferential track containing the flying height measurement signal; and
glide test means in the disk file and responsive to the third signal for providing surface profile signals indicating contact between the head and the surface while the disk is rotating.

8. The combination of claim 1, further including predictive failure analysis means connected to the storage means for providing a failure signal indicating disk file failure:
in response to spacing signals which indicate a change in the flying height of the head; or
in response to the third signals.

9. The combination of claim 1 further including predictive failure analysis means connected to the storage means for providing a failure signal indicating disk file failure:
in response to spacing signals which indicate a change in the flying height of the head.

10. In a disk file which includes one or more disks, means for rotating the one or more disks, one or more transducers, actuator means for moving the one or more disks, servo processor means controlling the actuator means and the means for rotating for radially positioning one or more transducers with respect to one or more disk surfaces and for setting a speed at which the disks are rotated, and data channel means for each transducer for reading signals from, or writing signals to, a disk, a method for in-situ measurement of the clearance between at least one transducer and a surface of a respective disk, the method including the steps of:
  (1) in the disk file, at a first time initially measuring flying height of a transducer and the contour of the respective surface at each speed of a plurality of respective speeds, the plurality of respective speeds forming a sequence of more than two speeds in which the respective disk is held at each respective speed during the measuring;
  (2) storing measurement results of step (1) in the disk file;
  (3) operating the disk file;
  (4) in the disk file, at a second time following the first time measuring the flying height of the head and the contour of the respective surface;
  (5) providing from the disk file an indication of disk file failure if comparison of the stored results of step (2) and the measured results of step (4) indicate a change in the flying height or a change in the surface profile; otherwise,
  (6) storing the measurement results of step (4) in the disk file and performing steps (3)–(5).

11. The method of claim 10, wherein the measuring steps (1) and (4) include measuring the flying height of the head with respect to predetermined locations on each of a plurality of circumferential tracks on the respective surface.

12. In a disk file which includes one or more rigid disks, means for rotating the one or more rigid disks, one or more transducers, actuator means for moving the one or more transducers across corresponding surfaces of the one or more disks, servo processor means controlling the actuator means and the means for rotating for radially positioning one or more transducers with respect to one or more disk surfaces and for setting a speed at which the disks are rotated, and data channel means for each transducer for reading signals from, or writing signals to, a disk, a combination for evaluating disk file operation, the combination comprising, for at least one transducer:
digital signal processing means in a data channel means connected to the transducer, the digital signal processing means responsive to a clearance control signal indicative of the speed of the disks for producing a readback signal in response to a measurement signal read from a disk surface by the transducer;
test condition means in the servo processor means for:
positioning the transducer with respect to a predetermined area of the surface where the measurement signal is located;
setting an initial speed at which the disk is rotated;
selectively changing the speed at which the disk is rotated in a sequence of more than two discrete steps, the disk being rotated at a respective speed at each step of the sequence and being held constant for a period of time at each respective speed; and
generating the clearance control signal;
clearance test means in the disk file means, connected to the digital signal processing means, and responsive to the readback signal for producing spacing signals at each respective speed representing the flying height of the transducer with respect to the surface at each of a plurality of predetermined locations on a circumferential track on the surface;
glide test means in the disk file means, connected to the digital signal processing means, and responsive to the readback signal for producing profile signals representing a relative height of the surface at each of a plurality of predetermined locations on the circumferential track;
storage means in the disk file and connected to the clearance test means and to the glide test means for storing spacing signals and profile signals for a plurality of circumferences on the surface; and
predictive failure analysis means connected to the clearance test means, the glide test means, and the storage means, for providing a failure signal indicating disk file failure:
in response to spacing signals which indicate a change in the flying height of the transducer; or
in response to profile signals which indicate an asperity on the surface.

13. The combination of claim 12, wherein the measurement signal includes a periodic signal of a substantially constant period positioned radially on the disk surface.

14. The combination of claim 13, wherein:
the digital signal processing means includes means for sampling the measurement signal at a rate proportional to the speed of the disks.

15. The combination of claim 13, wherein:
the readback signal includes predetermined harmonics of the measurement signal;
the digital signal processing means includes digital filter means for obtaining the predetermined harmonics in response to filter coefficient values which are proportional to the speed of the disks; and
the clearance control signal includes a portion indicating the filter coefficient values.

16. In a disk file which includes one or more rigid disks, means for rotating the one or more rigid disks, and processor means controlling the means for rotating for setting a speed at which the rigid disks are rotated, a combination comprising:
a circumferential portion of a surface on a rigid disk in which a measurement signal with substantially constant periodicity is written once and stored;
a head assembly including a transducer positioned adjacent the surface which is supported over the surface by rotation of the rigid disk;
signal processing means connected to the transducer and responsive to rotation of the rigid disk for producing a readback signal in response to the measurement signal;
clearance measurement means in the disk file and responsive to the readback signal for producing a set of first signals indicating clearance between the transducer and the surface at each of a plurality of locations on the circumferential portion at each speed of a plurality of speeds at which the rigid disk is rotated, each speed being held constant while the set of first signals is produced;
glide measurement means in the disk file and responsive to the readback signals for producing a set of second signals corresponding to surface contour measurements at a plurality of locations on the circumferential portion;
storage means in the disk file connected to the clearance and glide measurement means for storing sets of first and second signals for a plurality of circumferential portions of the disk; and
failure analysis means in the disk file, responsive to sets of first and second signals produced by said clearance and glide measurement means and to sets of first and second signals stored in said storage means for producing a third signal indicating impending failure of the disk file.

* * * * *

UNITED STATES PATENT AND TRADEMARK OFFICE
CERTIFICATE OF CORRECTION

PATENT NO.    : 5,410,439
DATED         : April 25, 1995
INVENTOR(S)   : Egbert et al It is certified that error appears in the above-indentified patent and that said Letters Patent is hereby corrected as shown below:

Column 13, line 52, insert a comma between the first occurrence of "signal" and the second occurrence of "the".

Column 14, line 11, change "signal" to --signals--; and line 14, change "claim 1" to --claim 7--.

Signed and Sealed this

Eighth Day of August, 1995

Attest:

BRUCE LEHMAN

Attesting Officer

Commissioner of Patents and Trademarks